United States Patent
Shah et al.

[19]

[11] Patent Number: 6,070,110

[45] Date of Patent: May 30, 2000

[54] HUMIDITY CONTROL THERMOSTAT AND METHOD FOR AN AIR CONDITIONING SYSTEM

[75] Inventors: Rajendra K. Shah, Indianapolis; Eugene L. Mills, Jr., Plainfield, both of Ind.

[73] Assignee: Carrier Corporation, Syracuse, N.Y.

[21] Appl. No.: 08/880,852

[22] Filed: Jun. 23, 1997

[51] Int. Cl.[7] .......................... G05B 13/00; G05B 15/00; G05B 21/00

[52] U.S. Cl. .................. 700/278; 165/238; 165/205; 165/43

[58] Field of Search ................. 165/238, 205, 165/43; 700/278

[56] References Cited

U.S. PATENT DOCUMENTS

| | | | |
|---|---|---|---|
| 4,003,729 | 1/1977 | McGrath | 62/93 |
| 4,482,007 | 11/1984 | Yoshimi et al. | |
| 4,884,214 | 11/1989 | Parker et al. | 364/505 |
| 5,062,276 | 11/1991 | Dudley | 62/176.6 |
| 5,231,845 | 8/1993 | Sumitani et al. | 62/160 |
| 5,305,822 | 4/1994 | Kogetsu et al. | 165/12 |
| 5,427,175 | 6/1995 | Nagasawa | 165/25 |
| 5,544,809 | 8/1996 | Keating et al. | 236/44 |
| 5,578,755 | 11/1996 | Offenberg | 73/514.32 |
| 5,598,715 | 2/1997 | Edmisten | 62/176.6 |

FOREIGN PATENT DOCUMENTS

| | | |
|---|---|---|
| 0 455 509 | 11/1991 | European Pat. Off. |
| 60-169039 | 9/1985 | Japan |
| 6-137643 | 5/1994 | Japan |
| 8-156178 | 6/1996 | Japan |
| WO89/12269 | 12/1989 | WIPO |

OTHER PUBLICATIONS

9801192 Singapore Search Report Jan. 27, 1999.

*Primary Examiner*—William Grant
*Assistant Examiner*—Victoria Robinson

[57] ABSTRACT

An air conditioner or heat pump system is equipped with a thermostat control which includes a temperature sensor and a humidity sensor and an algorithm to control the low voltage signals to the indoor blower section and the compressor to control operation of each in response to the indoor temperature and humidity conditions and the desired temperature and humidity setpoints.

8 Claims, 3 Drawing Sheets

HUMIDITY CONTROL THERMOSTAT AND METHOD FOR AN AIR CONDITIONING SYSTEM

BACKGROUND OF THE INVENTION

This invention relates to air conditioning and heat pump climate control systems and, particularly, to a method of operation control using a thermostat equipped with a humidity sensor to control the humidity in an enclosed space.

In the design of an air conditioner or a heat pump climate control system, it is general practice to use an indoor blower equipped to operate at one of two or three possible speeds. As such, system performance and efficiency is optimized at a few sets of a much larger number of possible sets of operating conditions. System performance at other conditions or blower speeds can be less than optimal but is considered acceptable on the basis of system design economy. System control is accomplished using a thermostat to cycle the compressor and blower on and off in response to a demand for sensible cooling, thereby, maintaining the temperature inside the structure at a desired level.

The humidity control capability of an air conditioning system is expressed as the ratio of sensible heat capacity to the total heat capacity and referred to as the Sensible Heat Ratio (SHR). The SHR is a function of the evaporator operating temperature, evaporator surface area, the dew point and the amount of the air entering the evaporator. One problem with typical system design is that the humidity control capability of the system is, in general, not optimized to the latent load requirements of the structure during all of its seasonal weather conditions. That is to say, while the air conditioner or heat pump is in satisfactory control of the sensible structure load, the humidity level is most often out of control. In fact, the indoor humidity levels during sensible load conditions considered "light loading" greatly exceed levels generally considered comfortable.

At outdoor dry bulb temperatures in the 65–85° F. range, air conditioning systems experience long idle times. That is, when the outdoor temperature is near or below the indoor temperature setpoint, the air conditioner is off and no cooling or dehumidification is performed. As at these outdoor temperatures, there is almost always a need for dehumidification the indoor humidity may rise to unacceptable levels resulting in mold, mildew and dust mite growth conditions. In addition, without dehumidification, the moisture content in the building structural materials rises which may cause damage. If the humidity is allowed to raise excessively, condensation could form on interior surfaces and could cause furniture damage. The problem is therefore, to develop a cooling system control that provides for dehumidification operation during idle periods which will keep humidity levels low enough to discourage or eliminate the growth of mold, mildew and dust mites and to prevent damage to the building and furniture.

Many homes and structures remain unoccupied by humans for extended periods of time. These long unoccupied periods pose a special problem in terms of dehumidification. Leaving the HVAC system to operate in order to dehumidify the space while unoccupied needlessly over cools the space and is energy inefficient. If the HVAC system is not operated the space will encounter long periods when moisture will accumulate and will promote the growth of mold and mildew. In addition, if the HVAC system is not operated for long periods and moisture is permitted to accumulate the HVAC system, once restarted, will require an extended period to dehumidify the space. Occupancy sensing controls have been used in conjunction with HVAC systems in the past wherein the HVAC system is either switched off or switched to a higher temperature setting. What is needed is a device and control method for an HVAC system that provides for an energy efficient amount of latent heat removal for use during both occupied and unoccupied periods.

Many attempts have been made to efficiently deal with the dehumidification of enclosed spaces. For instance many prior systems have added separate dehumidification apparatus to conventional HVAC systems and are disclosed in U.S. Pat. Nos. 5,598,715, 5,578,753, 5,427,175, 5,305,822, 5,231,845. U.S. Pat. No. 5,544,809 teaches a method which utilizes algorithm timing strategies to optimize air drying in an enclosed space. This method does not vary the SHR by controlling the air conditioning system component operation. Instead the system in '809 enables the HVAC system at fill capacity for timed intervals and then turns the HVAC system off for timed intervals based on temperature and humidity measurements. The result of such a system is that, as outlined above, the system may take a long time to actually catch up to the latent heat load requirements and high indoor humidity and low outdoor dry bulb conditions. In addition, '809 teaches a method that includes an occupancy sensor that automatically extends the system cycle time if the enclosed space is unoccupied.

SUMMARY OF THE INVENTION

It is an object of this invention to provide a device and method for controlling an air conditioning or heat pump system wherein indoor airflow and compressor operation are controlled during periods of light sensible loading to increase the dehumidification capabilities and limit humidity buildup during these periods.

It is an object of a further aspect of this invention to provide a device and method for controlling an air conditioning or heat pump system wherein the use of a thermostat which is equipped with a humidity sensor input for direct measurement of the indoor humidity level and a control algorithm using the measured temperature and humidity information to modify the operation of the indoor blower and the air conditioner or heat pump to improve the humidity control in a structure.

Further, it is an object of an additional aspect of this invention to provide an air conditioner or heat pump system which will respond to the thermostat signals in a manner which will result in improved humidity control performance.

BRIEF DESCRIPTION OF THE DRAWINGS

The accompanying drawings form a part of the specification. Throughout the drawings, like reference numbers identify like elements.

DESCRIPTION OF THE PREFERRED EMBODIMENTS

As will be described in greater detail below the present invention provides for governing an air conditioning system to control the humidity in an enclosed space. It should be evident however to one skilled in the art that the present invention is not limited to the specific examples given and could be utilized in other systems where latent heat removal is required.

Figure 1:
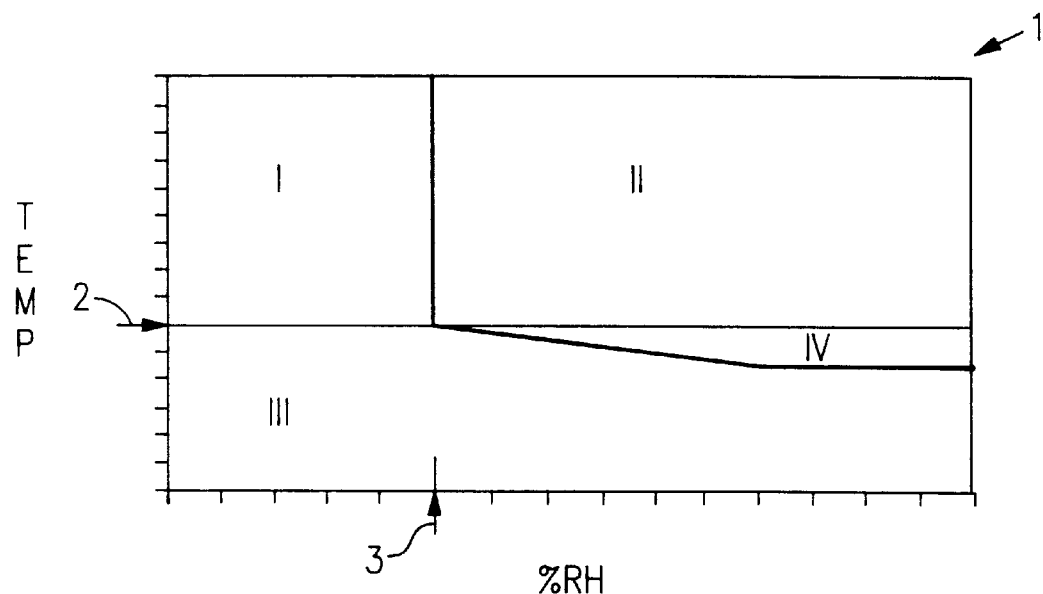
FIG. 1 is a graphical representation of the temperature and humidity in an enclosed space employing an air conditioning system operated in accordance with the first mode of the control method of the present invention.

Referring to FIG. 1 there is illustrated a typical operational mode map 1 for the present invention. The temperature 2 and humidity 3 setpoints, as well as the occupation mode setting (not shown), are selected by the user. In the operational mode illustrated in this particular figure, the occupation mode is set to "occupied". The temperature setpoint is depicted graphically by the arrow 2 and could, by way of example, represent a typical setting of 77° F. Similarly the humidity setpoint is indicated graphically by arrow 3 and could by way of example represent a setting of 55% RH. These settings are typical user selections for an occupied enclosed space.

The regions depicted in the mode map illustrated in FIG. 1 correspond to different operational modes of the HVAC system. In general, region I corresponds to conditions when the temperature in the enclosed space is above the setpoint temperature and the humidity in the enclosed space is below the humidity setpoint. Region II corresponds to conditions when both the temperature and the humidity in the enclosed space are above the respective setpoints. Similarly region III corresponds to conditions when the temperature in the enclosed space is below the setpoint temperature and the humidity in the enclosed space varies both above and below the humidity setpoint. Region IV corresponds to a discrete set of conditions where the temperature of the enclosed space is below the temperature setpoint and the humidity in the enclosed space is above the humidity setpoint. These regions are normal operating regions for any cooling system and help to illustrate the operation of the present invention. In region I, a demand exists for sensible cooling only. The air conditioning or heat pump system is commanded to operate to satisfy the sensible demand, but will also dehumidify to the extent limited by its SHR. This could lead to excessive drying of the indoor air resulting in a coolness feeling to an occupant. Region II is characterized by demand for both cooling and dehumidification. In general, all air conditioners or heat pumps can meet the demand for cooling in this region, but fail to meet the demand for dehumidification when the humidity exceeds the setpoint by more than a few percent. Attempts to meet this demand using humidistats or other schemes to override the temperature setpoint result in over-cooling, unless a second thermostat (or other device) is used to limit the over-cooling.

In accordance with the present invention, a single thermostat is utilized which monitors humidity as well as temperature to control the indoor blower and the compressor to improve the latent heat removal. The present invention operates to extend the dehumidification performance of the system as needed beyond the temperature setpoint in region IV to a second temperature limit as will be further defined below to improve the humidity control of the system. In region I, the air conditioner or heat pump is controlled as a normal system where the air flow from the indoor blower is normal and the compressor and blower are cycled on and off as necessary to meet sensible demand. In region II, the compressor is operated normally, but the airflow delivered by the indoor blower is adjusted, in one embodiment to 70–80% of the normal airflow, to lower the evaporator coil operating temperature and increase the latent heat removal capability of the evaporator, thereby decreasing SHR. If the relative humidity of the conditioned space is such that the temperature setpoint is satisfied before the air conditioner or heat pump has satisfied the dehumidification demand, as depicted by region IV, the system will be allowed to continue to run to further dehumidify the enclosed space. In one embodiment of the present invention the operation of the HVAC system in region IV is subject to the following temperature and humidity limits:

1. The humidity setpoint is satisfied and the temperature is above the limits described in 2 and 3,
2. The humidity is more that 6% greater than the setpoint, but the temperature is more than 3° F. below the temperature setpoint, and
3. The humidity is 0–6% greater than the setpoint and the temperature has fallen to more than 1° F. per each 2% RH error from the temperature and humidity setpoints respectively.

During operation of the HVAC system in region IV, the indoor airflow will be adjusted to as low a level as the system can operate without damage to the compressor or any other system component due to refrigerant floodback or due to a freezing evaporator coil. In a typical system normal airflow over the evaporator is 400 cubic feet of air per minute for every ton of cooling capacity (cfm/ton). In region IV the compressor is also cycled on and off at a rate necessary to match load requirements but, not to exceed a maximum on period or duty cycle. In one embodiment of the present invention, the compressor is run for a 10 minute maximum on-time with maximum duty cycle of 50%. Both of the above control actions will maximize the latent heat removal capability of the air conditioner or heat pump while minimizing the sensible heat capacity, thereby improving the humidity control characteristics of the system. By contrast, U.S. Pat. No. 4,003,729, which is commonly assigned, teaches a method of dehumidification wherein the speed of a fan is varied to decrease the amount of air flow across the evaporator to maintain the refrigerant level at the evaporator at a predetermined level. In the '729 patent there is a need to monitor refrigerant temperature and the compressor cycle is not varied in conjunction with evaporator fan speed to optimize latent heat removal.

Figure 2:
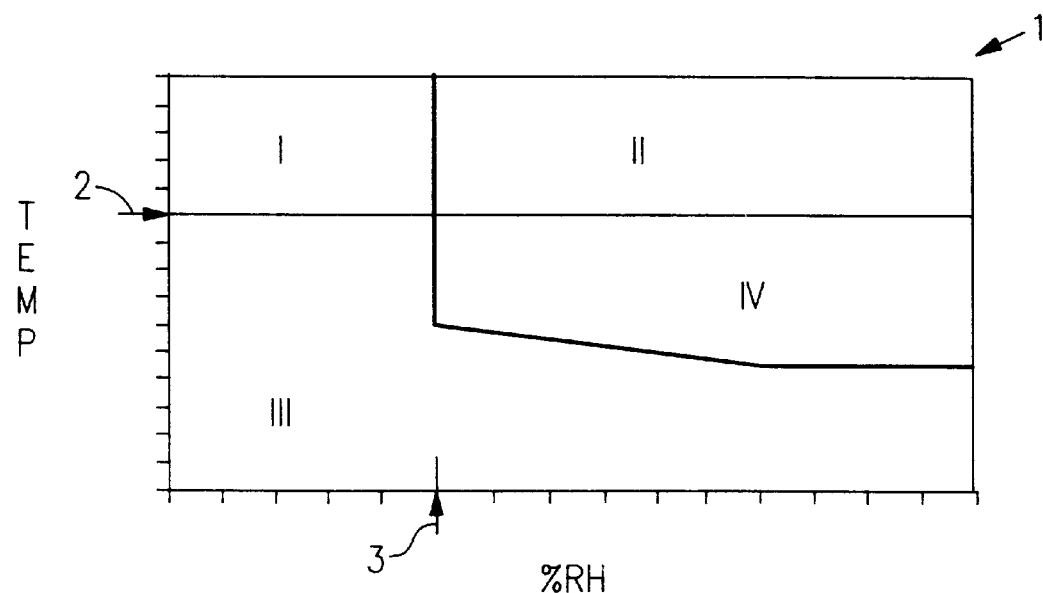
FIG. 2 is a graphical representation of the temperature and humidity in an enclosed space employing an air conditioning system operated in accordance with the second mode of the control method of the present invention.

Referring to FIG. 2 there is illustrated a second operational mode map for the present invention where the occupation mode is set to "unoccupied". The temperature setpoint is depicted graphically by the arrow 2 and could, by way of example, represent a typical setting of 85° F. Similarly the humidity setpoint is indicated graphically by arrow 3 and could by way of example represent a setting of 55% RH. These settings are typical user selections for an unoccupied enclosed space such as desired during a long period away from a home or building. The operation for all of the regions follow that of the occupied mode as shown in FIG. 1 and discussed above except for the following noted limit changes.

In region II operations are identical to that described above except that the temperature setpoint is usually selected by the user to be higher than that described above. In one embodiment of the present invention, the thermostat has a one button vacation feature which, when selected, sets the temperature setpoint to 85° F. and the humidity setting is maintained at the occupied mode setting.

In region IV the operation of the HVAC system is subject to the following temperature and humidity limits:

1. The humidity setpoint is satisfied and the temperature is above the limits described in 2 and 3, 2. The humidity is more that 6% greater than the setpoint but, the temperature is less than 70° F., and
3. The humidity is 0–6% greater than the setpoint and the temperature has fallen to more than 1° F. per each 1% RH error from 76° F. and the humidity setpoint respectively.

Another embodiment of the present invention anticipates the use of a multiple speed or variable speed compressor. In this embodiment the lowest compressor speed available is used in region IV to further limit the sensible capacity and maximize the latent capacity of the system.

Figure 3:
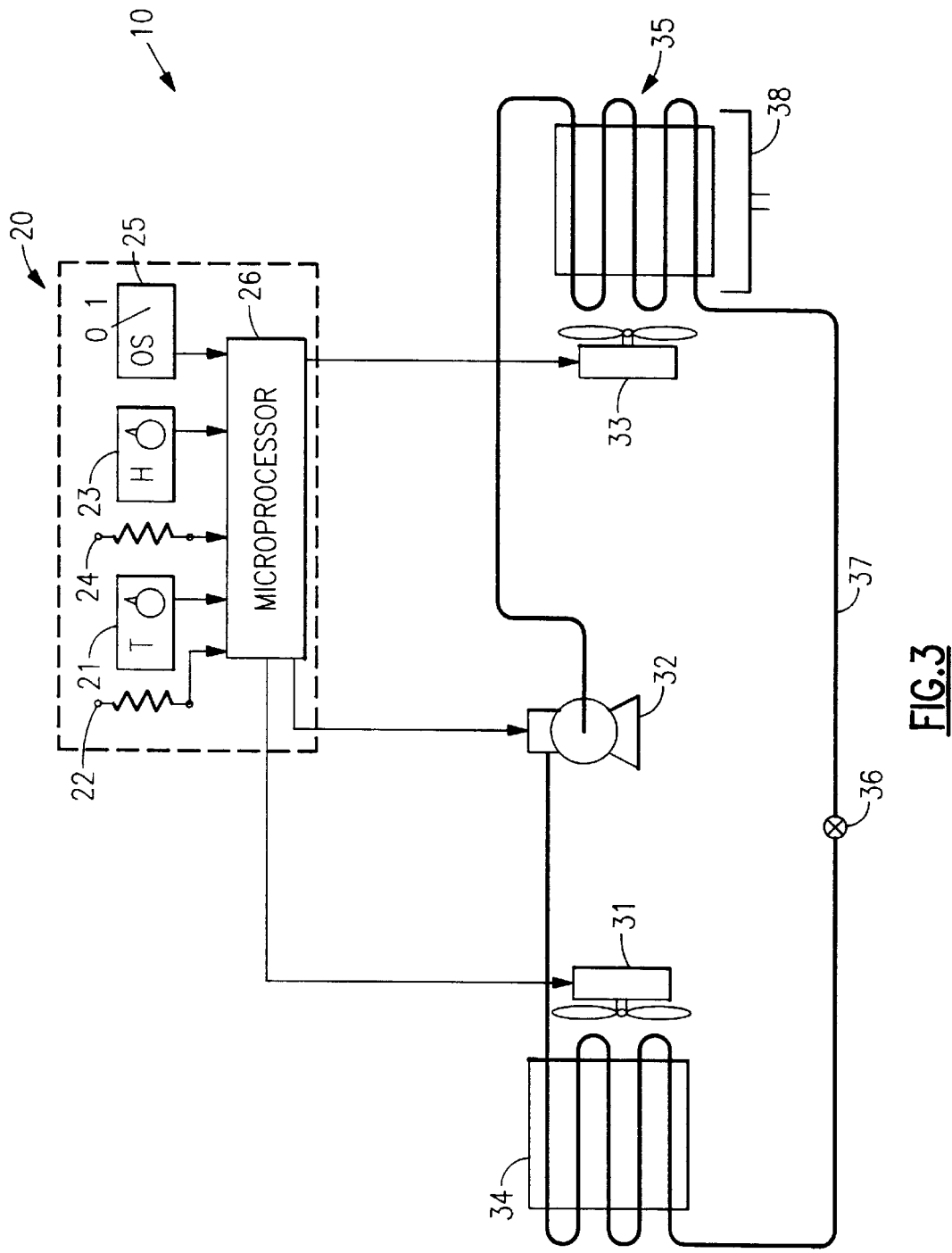
FIG. 3 is a schematic representation of an air conditioning system equipped with a particular embodiment of the control device of the present invention.

Referring to FIG. 3 there is depicted an HVAC climate control system 10 incorporating the control device and control method of the present invention. Included in the system is a thermostat 20, a central controller (unnumbered), a condenser fan 31, a compressor 32, an indoor blower fan 33, a condenser 34, an evaporator 35, a throttling valve 36, a closed circuit refrigerant line 37, and an evaporator drain pan 38.

The thermostat 20 includes a user temperature setting device 21 and temperature sensor 22, a user humidity setting device 23 and humidity sensor 24. Thermostat 20 further includes a user selectable occupy switch 25 and a microprocessor 26. The user selects the preferred temperature and humidity settings on devices 21 and 23 respectfully. These settings are converted to a digital signal and communicated to the microprocessor 26. In one embodiment these devices are digital touchpads. The user also selects the occupy mode from the switch 25 corresponding to whether the enclosed space will be occupied by individuals or not and the corresponding signal is communicated to the microprocessor 26. The temperature sensor 22 and the humidity sensor 24 generate a digital signal which corresponds to the temperature and humidity in the enclosed space. These signals are also communicated to the microprocessor 26.

The microprocessor compares the signals from the temperature sensor with the corresponding user setting, and the signals from the humidity sensor with the corresponding user setting and generates error signals corresponding to their differences. The microprocessor uses the error signals together with the occupy mode setting and an algorithm based on the limits described above to generate low voltage signals corresponding to indoor blower fan commands and compressor commands. These low voltage signals are communicated to the HVAC system directly from the thermostat. This is a significant difference over the prior art. The thermostat of the present invention is self contained and is capable of directly controlling single speed and variable speed HVAC systems. For instance U.S. Pat. No. 5,062,276 teaches the use of a separate system controller for controlling variable speed systems. The system described in the '276 patent requires thermostat and humidistat separate and apart from the system controller and cannot be applied to single speed systems.

During the cyclic operation of an air conditioner or heat pump operating in a high humidity condition, the indoor blower operation should be discontinued while the compressor is off to avoid re-evaporation of moisture which remains in the drain pan 38 and on the coil surface of the evaporator 35. This re-evaporation occurs to such an extent as to nullify the moisture removal of a typical system at some operating conditions. The thermostat of the present invention prohibits indoor blower operation for 5 minutes immediately following a compressor shut down while the humidity is above the humidity setpoint. This will limit re-evaporation by allowing the accumulated moisture on the evaporator coil and in the drain pan to drain off. One embodiment of the present invention incorporates a fan switch which allows for continuous operation of the indoor blower fan independent of the rest of the HVAC system subject to the limits described above.

Figure 4:
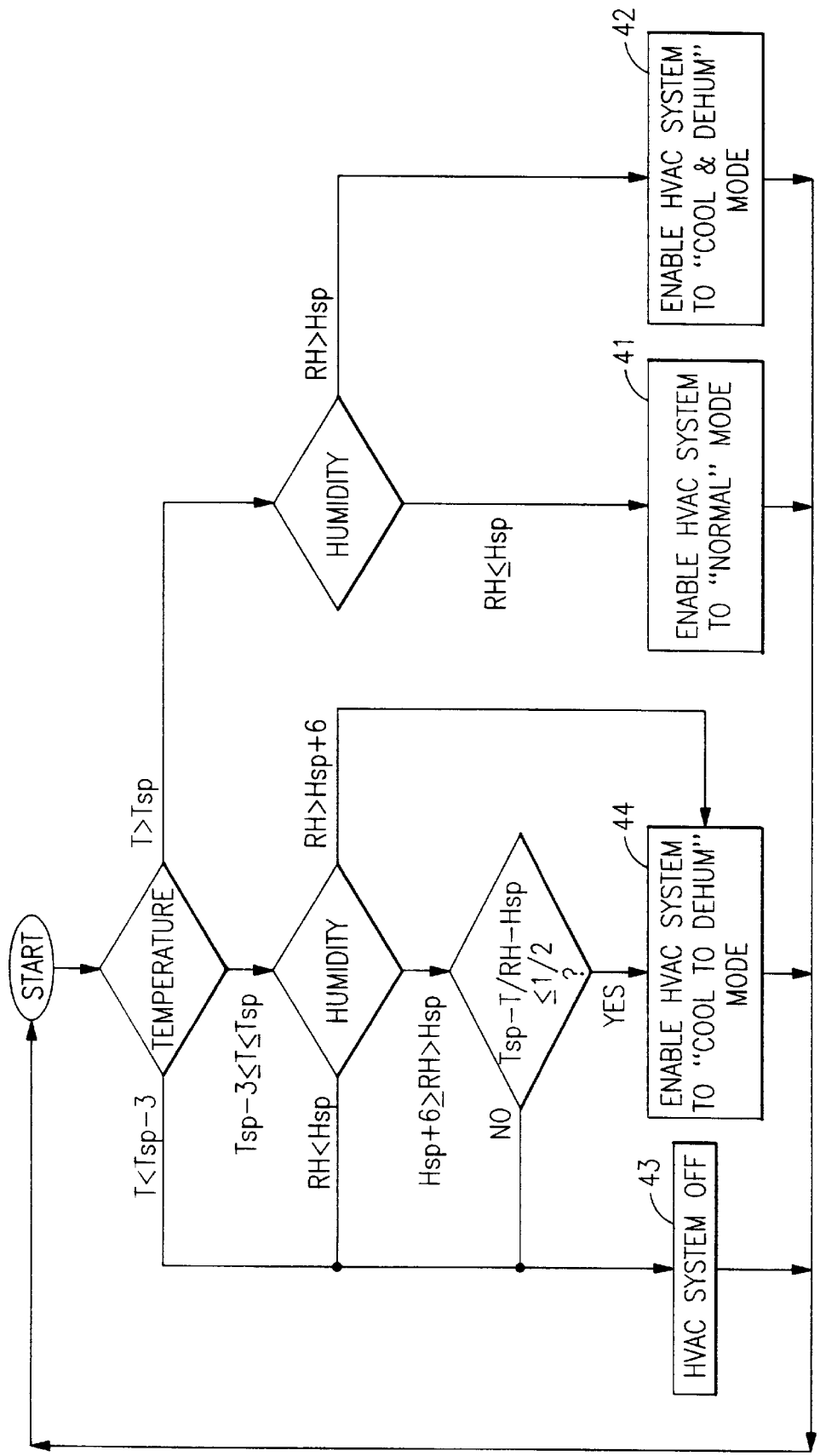
FIG. 4 is a flow diagram illustrating the algorithm logic employed by the microprocessor of the control device of the present invention represented in FIG. 3.

Referring to FIG. 4 there is illustrated a functional flow diagram corresponding to the algorithm logic of the microprocessor of one embodiment of the present invention as described herein above for the occupied setting. The logic of the present invention develops four different operational responses 41, 42, 43, and 44 determined from different temperature and humidity settings, sensed temperature and humidity conditions, and occupancy status. With reference to FIG. 1, region I corresponds to operation response "Normal" mode 41, region II to operation response "Cool & Dehum" mode 42, region III to HVAC System Off mode 43, and region IV to "Cool to Dehum" mode 44. The temperature of the room T is first determined and then compared to the temperature setpoint $T_{sp}$. If the temperature of the room is more than 3° F. colder than the temperature setpoint then operational response 43 is commanded and the HVAC system is turned off. The humidity is then determined and combined with the temperature data. For instance, referring to FIG. 4, if the temperature of the room T is colder than, or equal to, the temperature setpoint $T_{sp}$, but is no cooler than 3° less than the set point, then the operational mode will be determined based on humidity. If the sensed humidity in the room RH is lower than the humidity setpoint $H_{sp}$ then again the operational response 43 will be commanded and the HVAC system will be turned off. If the sensed humidity is more than 6% higher than the humidity setpoint then operational mode 44 will be commanded and the HVAC system will be commanded to remove the latent heat within the room by either cycling or slowing the indoor blower and reducing the duty cycle of the compressor.

The sloped portion of region IV illustrates the condition where the sensed humidity in the room is greater than the humidity setpoint but is less than 6% higher than the humidity setpoint. In this situation the room is not humid enough to necessitate "overcooling" the space. If the sensed humidity in the room is more than 2% greater than the humidity setpoint for every 1° F. of difference between the sensed room temperature and the temperature setpoint then operational response 44 will again be commanded. In the case where the sensed temperature of the room is warmer than the temperature setpoint some level of sensible cooling is required. If the sensed humidity in the room is lower than the humidity setpoint then operational mode 41 is commanded and the HVAC system is operated in a "Normal" mode to reduce the sensible heat. If the sensed humidity in the room is greater than the humidity setpoint then operational mode 42 is commanded and the indoor blower is cycled on and off or slowed down to improve the latent heat removal of the system. The same functional flow diagram holds for the unoccupied setting for the system subject to the rules described herein above.

What is claimed is:

1. A control device for controlling a climate control system of an enclosed space, the climate control system having a fan and a compressor, the control device comprising:
   a humidity sensor capable of perceiving the humidity in the enclosed space and providing a signal corresponding to the perceived humidity;
   a temperature sensor capable of perceiving the temperature in the enclosed space and providing a signal corresponding to the perceived temperature;
   a microprocessor operatively connected to receive the signals from the humidity sensor and the temperature sensor for comparing the perceived temperature and humidity to a predetermined temperature and a predetermined humidity setting, and for sending separate enabling signals to the fan and the compressor;

the microprocessor operative in a first operational mode to send a separate signal to the fan and to the compressor enabling the fan and compressor to operate at full capacity, and the microprocessor operative in a second operational mode to send a signal enabling the compressor to operate at full capacity and to send a separate signal enabling the fan to operate at less than full capacity.

2. A control device according to claim 1 wherein the microprocessor is further operative in a third operational mode to send a signal enabling the compressor to operate at less than full capacity and to send a separate signal enabling the fan to operate at less than full capacity.

3. A control device according to claim 1 wherein the microprocessor is further operative in a fourth operational mode to prohibit the operation of the fan for a predetermined time interval.

4. A method of controlling a climate control system of an enclosed space, the climate control system having an evaporator, a fan and a compressor, the method comprising:

sensing the humidity in the enclosed space;

sensing the temperature in the enclosed space;

comparing the sensed temperature and the sensed humidity with a desired temperature and a desired humidity; and controlling the climate control system to cause the temperature and humidity of the enclosed space to come within predetermined limits;

wherein the controlling step includes the step of prohibiting of the operation of the fan for a predetermined time interval following a compressor shutdown to allow accumulated moisture on the evaporator to drain off.

5. A method according to claim 4 wherein the controlling step further includes the steps of:

setting the desired temperature;

setting the predetermined humidity; and choosing an occupancy setting for selecting the predetermined temperature and humidity limits.

6. A system for conditioning the climate of an enclosed space, the system comprising:

a fan;

a compressor;

a humidity sensor capable of perceiving the humidity in the enclosed space and providing a signal corresponding to the perceived humidity;

a temperature sensor capable of perceiving the temperature in the enclosed space and providing a signal corresponding to the perceived temperature;

a microprocessor operatively connected to receive the signals from the humidity sensor and the temperature sensor for comparing the perceived temperature and humidity to a predetermined temperature and a predetermined humidity setting, and for sending separate enabling signals to the fan and the compressor;

the microprocessor operative in a first operational mode to send a separate signal to the fan and to the compressor enabling the fan and compressor to operate at full capacity, and the microprocessor operative in a second operational mode to send a signal enabling the compressor to operate at full capacity and to send a separate signal enabling the fan to operate at less than full capacity.

7. A climate control system according to claim 6 wherein the microprocessor is further operative in a third operational mode to send a signal enabling the compressor to operate at less than full capacity and to send a separate signal enabling the fan to operate at less than full capacity.

8. A climate control system according to claim 6 wherein the microprocessor is further operative in a fourth operational mode to prohibit the operation of the fan for a predetermined time interval.

* * * * *